United States Patent [19]

Pannwitz

[11] Patent Number: 4,596,475
[45] Date of Patent: Jun. 24, 1986

[54] THRUST BEARING

[76] Inventor: Hans U. Pannwitz, P.O. Box 67, Odessa, Fla. 33556

[21] Appl. No.: 640,304

[22] Filed: Aug. 13, 1984

Related U.S. Application Data

[63] Continuation-in-part of Ser. No. 205,109, Nov. 10, 1980, Pat. No. 4,465,385, which is a continuation of Ser. No. 33,200, Apr. 25, 1979, Pat. No. 4,239,301, which is a continuation-in-part of Ser. No. 834,903, Sep. 20, 1977, Pat. No. 4,175,804.

[51] Int. Cl.[4] ............................................. F16C 17/04
[52] U.S. Cl. .................................... 384/147; 384/223
[58] Field of Search ............... 384/147, 223, 225, 420, 384/224

[56] References Cited

U.S. PATENT DOCUMENTS

| 4,033,647 | 7/1977 | Beavers | 384/223 |
| 4,175,804 | 11/1979 | Pannwitz . | |
| 4,239,301 | 12/1980 | Pannwitz . | |
| 4,465,385 | 8/1984 | Pannwitz | 384/420 |

Primary Examiner—Lenard A. Footland
Attorney, Agent, or Firm—Frijouf, Rust & Pyle

[57] ABSTRACT

A thrust bearing is disclosed for enabling relative rotation between coaxial first and second members. The thrust bearing includes a pressure transmitting washer for transmitting axial thrust pressure between the members, the washer being disposed coaxially relative to the members. The washer defines a first central aperture through which the first member extends, the washer being disposed adjacent to the second member. A flexible spring for transmitting axial thrust pressure between the first member and the washer is of annular configuration. The spring is disposed coaxially relative to the first member and adjacent to the washer. The spring defines a central aperture through which the first member extends. A bearing for transmitting axial thrust pressure between the first member and the spring and for enabling relative rotation between the first member and the spring is disposed coaxially relative to the members. The bearing is disposed adjacent to the spring and defines a third aperture through which the first member extends such that the spring is disposed between the bearing and the washer. A retaining device is adjustably secured to the first member for retaining the washer, the spring and the bearing axially between the members. The retaining device cooperates with the first member and is disposed adjacent to the bearing.

13 Claims, 7 Drawing Figures

U.S. Patent  Jun. 24, 1986  4,596,475
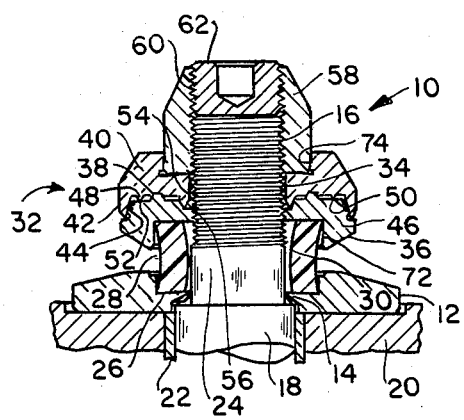
FIG. 1
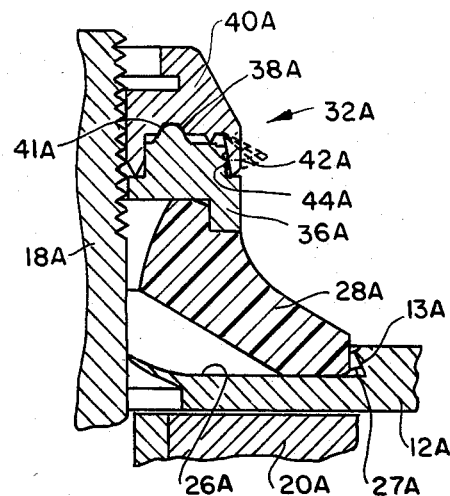
FIG. 2
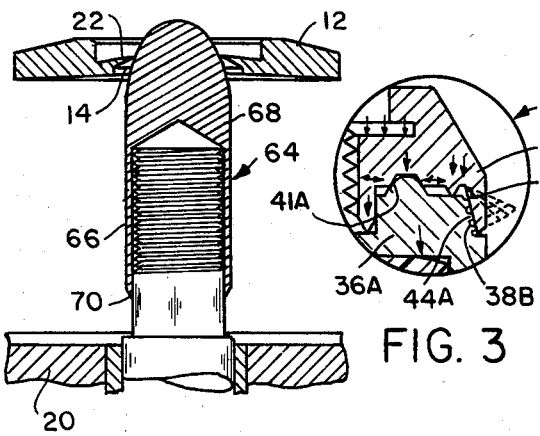
FIG. 3
FIG. 4
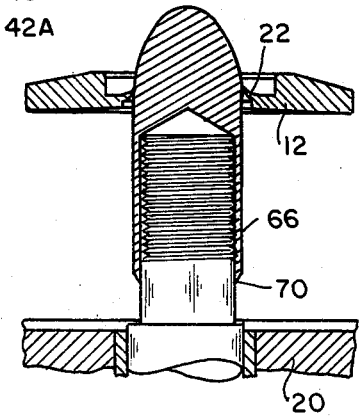
FIG. 5
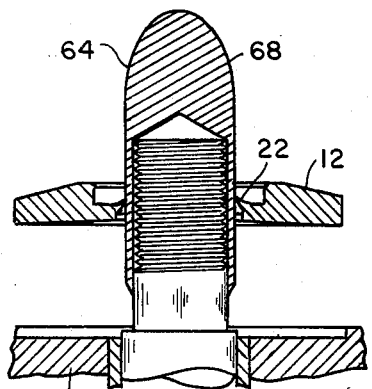
FIG. 6
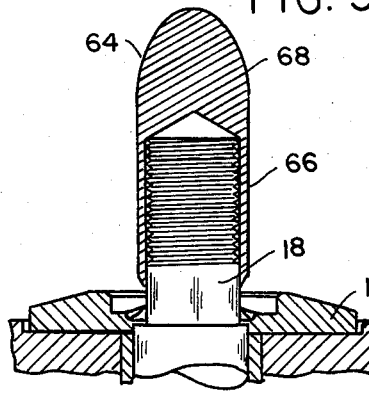
FIG. 7

THRUST BEARING

CROSS REFERENCE TO RELATED APPLICATIONS

This application is a continuation-in-part of application Ser. No. 205,109 filed Nov. 10, 1980, now U.S. Pat. No. 4,465,385, which was a continuation of application Ser. No. 33,200 filed Apr. 25, 1979, now U.S. Pat. No. 4,239,301. Application Ser. No. 33,200 was a continuation-in-part of application Ser. No. 834,903 filed Sept. 20, 1977, now U.S. Pat. No. 4,175,804. All matter set forth in the aforementioned applications is hereby incorporated by reference into the present application.

BACKGROUND OF THE INVENTION

1. Field of the Invention

This invention relates to a trust bearing for enabling relative rotation between coaxial first and second members. More specifically, this invention relates to a thrust bearing including a flexible biasing means for enabling rotation between coxial first and second members or the like.

2. Information Disclosure Statement

In the brewing industry and other food handling industries, the use of thrust bearings makes it necessary that such thrust bearings should provide a relatively smooth surface, thereby permitting easy cleaning of the same for reasons of hygiene. At the same time, thrust bearings are required that may be adjusted to the requisite thrust load during installation of the members. Furthermore, there exists a need in the foregoing industries for a thrust bearing that is simple to install and that has a relatively low cost.

In my prior U.S. Pat. No. 4,175,804 a thrust bearing is disclosed which includes an arcuate spring member which permits axial flexure between the first and the second member for supporting the thrust race against the main bearing race. However, in my prior issued patent it was not possible to adequately seal the members until the application of thrust load between the members. Furthermore, in my prior invention as taught by the aforementioned patent, the radial seal configuration was unable to provide a substantially hermetic seal without causing a substantial increase in friction between the seal and the sealed member.

The present invention overcomes the aforementioned inadequacies of my prior thrust bearing. It is therefore the primary object of the present invention to overcome the aforementioned inadequacies of my prior art thrust bearing and to provide improvements which significantly contribute to the ease with which a thrust bearing may be installed and the relatively low frictional forces imposed by such thrust bearing.

Another object of the present invention is the provision of a thrust bearing which may be easily installed between a first and a second member disposed coaxially relative each other.

Another object of the present invention is the provision of a spring thrust bearing in which the spring requires no precompression.

Another object of the present invention is the provision of a thrust bearing having an improved hermetic seal in which the seal imposes a relatively low frictional force to the sealed member.

Another object of the present invention is the provision of a thrust bearing in which the seal is able to be installed while the members are not under load.

Another object of the present invention is the provision of a seal for a thrust bearing for application to posts, studs, shafts, and axles, to prevent leakage between the relatively rotating members, thereby providing a hygienic bearing which inhibits the growth of mold or bacteria or the like.

Another object of the present invention is the provision of a thrust bearing including means for preloading the bearing by rotatably adjusting the retaining means to exert the required axial pressure to the bearing means.

Another object of the present invention is the provision of a self-adjusting thrust bearing which is able to compensate for wear of the various components over a relatively long period of time by means of the longitudinal flexing of the flexible spring means.

Another object of the present invention is the provision of a thrust bearing which is able to absorb shock and is reliable because of the non-existence of internal moving parts.

The foregoing has outlined some of the more pertinent objects of the present invention. These objects should be construed to be merely illustrative of some of the more pertinent features and application of the invention. Many other beneficial results can be obtained by applying the disclosed invention in a different manner or modifying the invention within the scope of the disclosure. Particularly with regard to the use of the invention disclosed herein, this should not be construed as being limited to thrust bearings for enabling relative rotation between coaxial members but should include thrust bearings disposed between any relatively rotatable members or the like.

SUMMARY OF THE INVENTION

The thrust bearing, according to the present invention, is defined by the appended claims with specific embodiments shown in the attached drawings. For the purpose of summarizing the invention, the invention relates to a thrust bearing for enabling relative rotation between coaxial first and second members. The thrust bearing includes a pressure transmitting means for transmitting axial thrust pressure between the members. The pressure transmitting means is disposed coaxially relative to the members and defines a first central aperture through which the first member extends. The pressure transmitting means is disposed adjacent to the second member. A flexible spring means for transmitting axial thrust pressure between the first member and the pressure transmitting means is disposed coaxially relative to the members. The spring means of annular configuration is disposed adjacent to the pressure transmitting means. The spring means defines a second central aperture through which the first member extends. The bearing means is disposed coaxially relative to the members and is disposed adjacent to the spring means. The bearing means transmits axial thrust pressure between the first member and the spring means and enables relative rotation between the first member and the spring means. The bearing means defines a third aperture through which the first member extends such that the spring means is disposed between the bearing means and the pressure transmitting means. A retaining means is adjustably secured to the first member for retaining the pressure transmitting means, the spring means and the bearing means axially between the members. The retaining means cooperates with the first member and is disposed adjacent to the bearing means.

In a more specific embodiment of the present invention, the pressure transmitting means is a base washer having integrally formed thereon an annular seal which extends radially inwardly from the base washer to sealingly engage the outer surface of the first member. The annular seal includes a lip having a thickness which reduces radially in the direction towards the first member. The base washer also defines a first annular groove which receivably cooperates with the flexible spring means for radially locating the flexible spring means relative to the base washer. The flexible spring means is of unitary construction and of substantially concave configuration. The spring means is of flexible plastic material such that the flexible spring means may absorb flexure pressure transmitted between the members. The bearing means includes a main bearing race and a thrust race, the main bearing race having a plurality of bulbous protrusions extending therefrom for cooperating with the thrust race, enabling relative rotation between the thrust race and the main bearing race. The thrust race includes an outer skirt of annular configuration disposed coaxially relative to the first member, the outer skirt cooperating with the outer surface of the main bearing race, enabling sealing engagement therewith during relative rotation between the thrust race and the main bearing race.

The thrust race further includes a plurality of concentric rings of V-shaped cross-sectional configuration such that the apices of the rings cooperate with the main bearing race for providing further bearing surfaces between the thrust race and the main bearing race. An inner skirt integrally formed with the thrust bearing extends from the thrust race and is disposed annularly relative to the thrust race, the inner skirt being coaxial with the first member. The distal end of the inner skirt is of V-shaped configuration such that the apex of the V-shaped skirt cooperates with the main bearing race in bearing relationship therewith. The bearing means defines a third central aperture through which the first member extends such that the flexible spring means is disposed between the main bearing race and the base washer. The retaining means defines a fourth aperture which is internally threaded to cooperate with an external thread formed on the first member such that rotation of the retaining means relative to the first member results in axial pressure being exerted upon the thrust race to adjustably vary the thrust loading of the thrust bearing.

In a further embodiment of the present invention, the main bearing race includes a plurality of bulbous protrusions integrally formed with and extending from the main bearing race, and the thrust race defines an annular groove of trapezoidal cross-sectional configuration for receivbly cooperating with the bulbous protrusions, enabling relative rotation between the thrust race and the main bearing race.

In the alternative embodiment of the present invention, a single ring of V-shaped cross-sectional configuration is integrally formed and extends from the thrust race for bearingly cooperating with the main bearing race. The outer skirt of the thrust race sealingly cooperates with the outer surface of the main bearing race and is disposed angularly relative to the axis of rotation of the first member. The flexible biasing means of the alternative embodiment is of a configuration such that axial load applied to the bearing means is substantially converted into radial pressure exerted between the flexible biasing means and the annular groove of the cooperating base washer.

The method of installing the annular seal to the protruding, threaded end of the first member includes the steps of positioning a pilot over the threaded end of the first member with the skirt of the pilot closely conforming to the threaded portion of the first member and with the bulbous portion of the pilot extending away from the second member. The base washer is placed centrally relative to the bulbous portion of the pilot, and the base washer is urged axially relative to the pilot towards the second member such that the annular seal slides over the length of the bulbous portion of the pilot. The base washer is further urged longitudinally along the pilot and along the skirt of the pilot until the annular seal slides off the end of the distal end of the skirt of the pilot. The base washer is further urged into a contiguous disposition relative to the second member with the annular seal sealingly engaging the non-threaded portion of the first member.

The foregoing has outlined rather broadly the more pertinent and important features of the present invention in order that the detailed description that follows may be better understood so that the present contribution to the art can be more fully appreciated. Additional feature of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the present invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a sectional view of the thrust bearing of the present invention;

FIG. 2 is a fragmentary sectional view on an enlarged scale of an alternative embodiment of the present invention showing the trapezoidal shaped annular groove of the thrust race;

FIG. 3 is an enlarged sectional view of a portion of the thrust bearing shown in FIG. 2;

FIG. 4 is a sectional view of the members and the base washer showing the assembly of the annular seal and with the pilot positioned over the threaded portion of the first member and with the base washer centrally positioned adjacent the bulbous portion of the pilot;

FIG. 5 is a similar view to that shown in FIG. 4 but shows the base washer having been moved axially along the bulbous portion of the pilot with the annular seal sealingly engaging the pilot;

FIG. 6 is a similar view to that shown in FIG. 4 but shows the further axial movement of the base washer such that the annular seal is sliding adjacent to the annular skirt of the pilot;

FIG. 7 is a similar view to that shown in FIG. 4 but shows the base washer with the angular seal sealingly engaging the non-threaded portion of the first member.

Similar reference characters refer to similar parts through the several views of the drawings.

DETAILED DESCRIPTION

FIG. 1 is a sectional view of the thrust bearing according to a first embodiment of the present invention. The thrust bearing generally designated 10 includes a pressure transmitting means or base washer 12. The base washer 12 defines a first aperture 14 and a threaded end 16 of a first member 18 extends through the first aperture 14 such that the base washer 12 is disposed coaxially relative to the first member 18. The base washer 12 is disposed adjacent to a second member 20. The first and the second members 18 and 20, respectively are coaxial relative to each other about the first member 18. A resilient annular seal 22 is integrally formed with the base washer 12 and extends radially inward therefrom to define the first aperture 14. The annular seal 22 decreases in thickness from the base washer 12 towards the unthreaded portion 24 of the first member 18 such that the distal end of the annular seal 22 which forms an annular lip extends towards and sealingly engages the unthreaded portion 24 of the first member 18. A first annular groove 26 is defined by the base washer 12, and a flexible spring means 28 is receivably disposed within the first annular groove 26 of the base washer 12. The flexible spring means 28 is disposed adjacent to the pressure transmitting means 12, and the spring means 28 defines a second aperture 30 through which the first member extends. The flexible spring means 28 is of generally concave configuration and is of relatively flexible plastics material and is of unitary construction.

A bearing means generally designated 32 transmits thrust pressure between the first member 18 and the spring means 28. The bearing means 32 also enables relative rotation between the first member 18 and the spring means 28. The bearing means 32 is disposed coaxially relative to the first and second member 18 and 20, respectively, and is disposed adjacent to the spring means 28. The bearing means 32 defines a third central aperture 34 through which the first member 18 extends such that the spring means 28 is disposed between the bearing means 32 and the base washer 12. More particularly, the bearing means 32 includes a main bearing race 36 having a plurality of bulbous protrusions 38 extending therefrom. The bearing means 32 also includes a thrust race 40 which cooperates with the main bearing race 36 such that the bulbous protrusions 38 which are integrallly formed with the main bearing race 36 enable relative rotation between the thrust race 40 and the main bearing race 36. The thrust race 40 includes an integrally formed annular outer skirt 42 which cooperates with the outer surface 44 of the main bearing race 36 such that the outer skirt 42 sealingly engages the outer surface 44 of the main bearing race 36. The thrust race 40 furter includes a plurality of concentric rings 46 and 48, each of the concentric rings having a substantially V-shaped cross-sectional configuration. The apices 50 and 52 of the concentric rings 46 and 48 respectively cooperating with the main bearing race to provide a secondary bearing surface therewith.

The thrust race 40 further includes an inner skirt 54 integrally formed with the thrust race 40 and extending therefrom. The inner skirt 54 terminates at the distal end 56 thereof in a V-shaped configuration with the apex of the V-shaped inner skirt cooperating with the main bearing race to provide a further bearing surface therewith.

A retaining means generally designated 58 defines a fourth aperture 60 which is internally threaded and which cooperates with the threaded protruding end 16 of the first member 18 such that when the retaining means 58 is screw threaded onto the threaded end of the first member 18, the retaining means 58 progressively urges the thrust race axially into engagement with the main bearing race 36 against the biasing force of the flexible spring means 28 against the base washer 12 and the second member 20. A plug 62 having an external thread cooperates with the threaded fourth aperture 60 of the retaining means 58 to lock the retaining means 58 into engagement with the threaded end 16 of the first member 18. A suitable Allen key may be used to turn the plug 62 into contact with the distal end of the first member 18.

FIG. 2 is an enlarged sectional view of a portion of a further embodiment of the present invention and is similar to the first embodiment as described hereinbefore with reference to FIG. 1. Similar elements of the alternative embodiment are hereinafter designated the same reference numerals as the numerals applied to the first embodiment. However, the suffix A has been added. The bearing means 32A includes a main bearing race 36A having a plurality of bulbous protrusions 38A integrally formed with and extending from the main bearing race and a plurality of bulbous protrusions extending from an outer surface 44A as will be described hereinafter. The bearing means 32A also includes as thrust race 40A which defines an annular bearing groove 41A of substantially trapezoidal cross-sectional configuration such that the annular bearing groove 41A receivably engages the bulbous protrusions 38A of the main bearing race 36A, enabling relative rotation between the main bearing race 36A and the thrust race 40A. The thrust race 40A includes the annular outer skirt 42A which extends from and is integrally formed with the thrust race. The outer skirt 42A is biased inwardly by the resiliency of the material of the outer skirt 42A to sealingly engage the outer surface 44A of the main bearing race 36A. The outer skirt 42A seals against the outer surface 44A of the main bearing race 36A angularly relative to the longitudinal axis of the first member 18A. The outer surface 44A includes a plurality of bulbous protrusions 38B to reduce the friction between the main bearing race 32A and the outer skirt 42A while maintaining a seal therebetween. The flexible spring means 28A is of hollow, conical configuration such that axial pressure exerted between the first and the second members 18A and 20A is translated substantially into pressure that is exerted radially between the flexible spring means 28A and an angled cooperating wall 13A of the pressure transmitting means or base washer 12A. The cooperating wall 13A of the base washer 12A partially defines the first annular groove 26A of the base washer 12A, and the cooperating wall 13A is undercut at 27A, thereby facilitating radial movement of the flexible spring means 28A during the aforementioned axial movement between the first and second members 18A and 20A respectively.

FIG. 3 is a further enlarged sectional view of a portion of the bearing means 32A showing the distribution of pressure exerted between the thrust race and the main bearing race and the ability of the outer skirt 42A to flex radially relative to the outer surface 44A of the main bearing race 36A.

FIGS. 4–7 show the various steps involved in assembling the pressure transmitting means or base washer adjacent to the second member 20. FIG. 4 shows a pilot 64 that is placed with the skirt 66 of the pilot 64 slipped over the threaded end 16 of the first member 18 and the base washer 12 having been placed centrally over a bulbous head 68 of the pilot 64.

FIG. 5 shows the base washer 12 moved axially along the bulbous head 68 of the pilot 64 and with the lip of the annular seal 22 sliding along the surface of the bulbous head 68.

FIG. 6 shows the further movement of the base washer 12 along the skirt of the pilot 64.

FIG. 7 shows the base washer 12 having been moved axially relative to the first member 18 until the annular seal 22 slips off the distal end 70 of the annular skirt 66 of the pilot 64, and the base washer 12 is pushed into contiguous disposition relative to the second member 20. When the base washer 12 is located as shown in FIG. 7, the annular seal 22 sealingly engages against the unthreaded portion 24 of the first member 18. The pilot 64 may then be removed to allow further assembly.

In operation of the thrust bearing 10 as shown in FIG. 1, the base washer 12 is assembled adjacent to the second member 20 as described hereinbefore with reference to FIGS. 4–7. The flexible spring means 28 is slipped over the threaded end 16 of the first member 18 until the flexible spring means 28 is engaged within the first annular groove 26 of the base washer 12. The combined bearing means 32 is next slipped over the threaded end of the first member 18, and the main bearing race which defines a second annular groove 72 receivably cooperates with the flexible spring means 28 to position the flexible spring means 28 between the bearing means 32 and the base washer 12. The retaining means 58 is rotated into threaded engagement with the threaded end of the first member 18, and the retaining means cooperates with a third annular groove 74 defined by the thrust race such that continued rotation of the retaining means 58 urges the thrust race and cooperating main bearing race into bearing engagement relative to each other against the biasing force exerted by the flexible spring means 28 against the main bearing race. When the requisite loading pressure has been exerted on the thrust bearing, the plug 62 is screwed into the cooperating threaded fourth aperture 60 until the plug 62 engages the threaded end 16 of the first member 18, thereby locking the thrust bearing in the required position thereof.

The operation of the alternative embodiment of the present invention as described with reference to FIGS. 2 and 3 similar to the operation as described with reference to FIG. 1. However, the bulbous protrusions 38A cooperate with the trapezoidal annular groove defined by the thrust race 40 to provide low friction, increased bearing surface, and positive radial stability between the main bearing race 36A and the thrust race 40A. Furthermore, as the bulbous protrusions 38A tend to wear with use with the thrust race 40A, the outer skirt 42A tends to wear equally at the distal end thereof. However, the angular disposition of the outer skirt 42A relative to the outer surface 44A of the main bearing race 36A, enables the seal between the outer skirt 42A and the outer surface 42A of the main bearing race 36A continues to function efficiently irrespective of the wear of the bearing.

Also, the annular flexible spring means 28A is of hollow truncated conical configuration so that when axial pressure is exerted between the members 18A and 20A respectively, the pressure is translated from an axial to a radial direction to urge the spring means against the cooperating wall portion 13A of the first annular groove 26A of the base washer.

The thrust bearing of the present invention provides an improved sealing means for sealing engagement with the first member and provides means for correctly sealing the first member prior to the installation of the remainder of the thrust race. Furthermore, the thrust bearing of the present invention may be assembled without any prior compression of the flexible spring.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A thrust bearing for enabling relative rotation between a first and a second member, said thrust bearing comprising in combination:

pressure transmitting means for transmitting axial thrust pressure between the members, said pressure transmitting means being disposed coaxially relative to the members, said pressure transmitting means defining a first central aperture through which the first member extends, said pressure transmitting means being disposed adjacent to the second member;

said pressure transmitting means further including:
seal means integrally formed with said pressure transmitting means, said seal means defining said first central aperture, said seal means extending radially inwardly towards the first member for sealingly engaging the outer surface of the first member; said seal means being an annular lip extending from said pressure transmitting means, said annular lip decreasing in thickness in the radial direction from said pressure transmitting means towards the first member such that said annular seal provides a flexible first aperture through which the first member extends, enabling sealing cooperation between the first member and the annular seal;

flexible spring means for transmitting axial thrust pressure between the first member and said pressure transmitting means, said spring means being of annular configuration and disposed coaxially relative to the members and adjacent to said pressure transmitting means, said spring means defining a second central aperture through which the first member extends;

bearing means for transmitting axial thrust pressure between the first member and said spring means and for enabling relative rotation between the first member and said spring means, said bearing means being disposed coaxially relative to the members and disposed adjacent to said spring means, said bearing means defining a third central aperture through which the first member extends such that the spring means is disposed between said bearing means and said pressure transmitting means; and retaining means adjustably secured to the first member for retaining said pressure transmitting means, said spring means and said bearing means axially between the members, said retaining means cooperating with the first member and being disposed adjacent to said bearing means.

2. A thrust bearing as set forth in 1 wherein said pressure transmitting means is a base washer.

3. A thrust bearing as set forth in 1 wherein said pressure transmitting means further includes:
   a first annular groove disposed adjacent to said seal means, said first annular groove receivable cooperating with said flexible spring means for locating said flexible spring means radially relative to said pressure transmitting means.

4. A thrust bearing as set forth in claim 1 wherein said bearing means further includes:
   a main bearing race;
   a thrust race, said thrust race and said main bearing race cooperating together for enabling relative rotation between said main bearing race and said thrust race.

5. A thrust bearing as set forth in claim 4 wherein said main bearing race is disposed adjacent to said flexible spring means.

6. A thrust bearing as set forth in claim 5 wherein said main bearing race further includes:
   a second annular groove defined by said main bearing race for receivably cooperating with said flexible spring means, said second annular groove being coaxial with the first member.

7. A thrust bearing as set forth in claim 6 wherein said thrust race further includes:
   an outer skirt extending from the peripheral edge of said thrust race, said outer skirt cooperating with the outer surface of said main bearing race such that when said thrust race is rotated relative to said main bearing race said outer skirt seals against the outer surface of said main bearing race.

8. A thrust bearing as set forth in claim 7 wherein said outer surface of said main bearing race forms an angle relative to the axis of rotation of the thrust bearing; and
   said outer skirt having a sealing surface which is angularly disposed for cooperation with said outer surface of said main bearing race enabling the seal between said outer surface of said main bearing race and said sealing surface of said outer skirt to be self adjusting during the wear of the thrust bearing.

9. A thrust bearing as set forth in claim 7 wherein said bearing means further includes:
   a plurality of bulbous protrusions, said protrusions extending from said main bearing race, said protrusions cooperating with said thrust race, enabling relative rotation between said thrust race and said main bearing race.

10. A thrust bearing as set forth in claim 9 wherein said bearing means further includes:
    a plurality of protrusions extending from said thrust race, said protrusions extending from said thrust bearing being of generally V-shaped cross-sectional configuration with the apices of the V-shaped protrusions cooperating with said main bearing race, enabling relative rotation between said thrust race and said main bearing race.

11. A thrust bearing as set forth in claim 1 wherein said pressure transmitting means further includes:
    a first annular groove defined by said pressure transmitting means and disposed adjacent to said flexible spring means for radially locating said flexible spring means relative to said pressure transmitting means.

12. A thrust bearing as set forth in claim 1 wherein said retaining means further includes:
    a fourth aperture defined by said retaining means, said fourth aperture being internally threaded for cooperation with a threaded end of the first member such that as the retaining means is rotated relative to the first member the internal thread of the retaining means cooperates with the threaded end of the first member to adjustably urge said bearing means axially toward said pressure transmitting means against the biasing pressure of the flexible spring means.

13. A thrust bearing for enabling relative rotation between coaxial first and second members, said thrust bearing comprising in combination:
    pressure transmitting means for transmitting axial thrust pressure between the members, said pressure transmitting means being disposed coaxially relative to the members, said pressure transmitting means defining a first central aperture through which the first member extends, said pressure transmitting means being disposed adjacent to said second member;
    flexible biasing means for transmitting axial thrust pressure between the first member and said pressure transmitting means, said biasing means being of annular configuration and disposed coaxially relative to the members and adjacent to said pressure transmitting means, said biasing means defining a second central aperture through which the first member extends;
    bearing means for transmitting axial thrust pressure between the first member and said biasing means and for enabling relative rotation between the first member and said biasing means, said bearing means being disposed coaxially relative to the members and disposed adjacent to said biasing means, said bearing means defining a third central aperture through which the first member extends such that the biasing means is disposed between said bearing means and said pressure transmitting means;
    said bearing means further including a main bearing race having a plurality of bulbous-shaped protrusions extending therefrom;
    said bearing means also including a thrust race defining an annular groove of trapezoidal cross-sectional configuration for receivably cooperating with said plurality of bulbous protrusions, enabling relative rotation between said main bearing race and said thrust race;
    said thrust race further including an outer skirt integrally formed with and extending from said thrust race for cooperating with the outer surface of said main bearing race, said outer skirt sealingly contacting said outer surface of said main bearing race, enabling sealing engagement between said outer skirt and said outer surface of said main bearing race during relative rotation between said thrust race and said main bearing race, said sealing surface being disposed angularly relative the longitudinal axis of the first member.

* * * * *